United States Patent [19]

Fukushima

[11] Patent Number: 5,448,396
[45] Date of Patent: Sep. 5, 1995

[54] PHOTO ISOLATOR

[75] Inventor: Takehiro Fukushima, Kawasaki, Japan

[73] Assignee: Fujitsu Limited, Kawasaki, Japan

[21] Appl. No.: 113,668

[22] Filed: Aug. 31, 1993

[30] Foreign Application Priority Data

Feb. 24, 1993 [JP] Japan .................. 5-035714

[51] Int. Cl.⁶ .............................................. G02F 1/01
[52] U.S. Cl. .................... 359/257; 359/279; 359/260; 359/183
[58] Field of Search ........... 359/260, 257, 68, 73, 359/183, 279

[56] References Cited

U.S. PATENT DOCUMENTS

| | | |
|---|---|---|
| 3,584,959 | 6/1971 | Del Carlo . |
| 4,209,690 | 6/1980 | Rentzepis . |
| 4,783,361 | 11/1988 | Ovshinsky et al. ............. 359/722 |
| 5,128,798 | 7/1992 | Bowen et al. ................ 359/260 |
| 5,287,214 | 2/1994 | Robertson et al. .............. 359/260 |
| 5,303,020 | 4/1994 | Croteau ..................... 359/257 |

*Primary Examiner*—Scott J. Sugarman
*Assistant Examiner*—Thomas Robbins
*Attorney, Agent, or Firm*—Staas & Halsey

[57] ABSTRACT

A photo isolator transmits light of a frequency fo in the normal direction and substantially intercepts the light in the reverse direction. A phase modulator comprising an optical crystal having a refractive index, counter faces and counter electrodes formed on the counter faces. The phase modulator receives an electrical signal having a frequency of $\Delta f$ or higher and changes the refractive index of the optical crystal by the Pockels effect. A narrow band pass filter has a half band width of $\Delta f$, is mounted on an optical axis, and substantially transmits light having frequency of from $(fo-\Delta f)$ to $(fo+\Delta f)$. The phase modulator is juxtaposed with the narrow band pass filter on the optical axis.

6 Claims, 5 Drawing Sheets

(FORWARD)

(REVERSE)

PHOTO ISOLATOR

BACKGROUND OF THE INVENTION a) Field of the Invention

The present invention relates to a photo isolator suitable for use with optical information processors and the like.

b) Description of the Related Art

A photo isolator using a magnetooptical element is known in the art. FIG. 6 is a schematic diagram showing a conventional photo isolator using a magnetooptical element.

A magnetooptical element 51 is positioned at an optical axis Ox. Polarizers 52a and 52b are disposed on opposite sides of the element 51 with their polarizing axes being deviated by 45 degrees. The magnetooptical element 51 has a function of rotating the polarizing axis of incident light by 45 degrees under the application of a magnetic field M. The rotation direction of linearly polarized light is the same as the direction of current flowing in an electromagnet which generates the magnetic field M.

Light 50 propagating along the optical axis is applied to the input side polarizer 52a and becomes linearly polarized light having a polarizing axis of angle of 0 degree. This linearly polarized light becomes incident to the magnetooptical element 51 whereat the polarizing axis is rotated by 45 degrees. The light outputted from the element 51 becomes linearly polarized light having a polarizing axis with a 45 degree angle. This linearly polarized light transmits through the polarizer 52b because the direction of the polarizing axis of the incident light is the same as the direction of the polarizing axis of the polarizer 52b.

Light propagating in the reverse direction along the optical axis Ox passes through the right side polarizer 52b. If light incident to the polarizer 52b is not being polarized, the polarizer 52b changes the incident light to linearly polarized light having a polarizing axis with a 45 degree angle.

The linearly polarized light having a polarizing axis with a 45 degree angle becomes incident to the magnetooptical element 51 whereat the direction of polarization is rotated by 45 degrees. Namely, the polarizing axis of outputted light is in the direction of angle of 90 degrees. This direction is perpendicular to the polarizing axis of the left side polarizer 52a, so that the light is intercepted by the polarizer 52a.

As described above, the photo isolator shown in FIG. 6 transmits the light propagating to the right side and intercepts the light propagating to the left side. In this manner, a unidirectional light transmission function of the photo isolator is realized.

A photo isolator using a magnetooptical element has an excellent directional property. However, it is necessary to use a magnet for applying a magnetic field to the magnetooptical element, resulting in a large sized apparatus and generating leakage fluxes. In an apparatus using a magnetic field of high intensity, such as a photomagnetic disk, the external magnetic field leaked from the apparatus may affect the magnetic field of the photo isolator, lowering the precision of the photo isolator.

SUMMARY OF THE INVENTION

It is an object of the present invention to provide a photo isolator which does not require a magnet and is free from the influence of an external magnetic field.

According to one aspect of the present invention, there is provided a photo isolator for transmitting light of a frequency fo in the normal direction and substantially intercepting the light in the reverse direction, including a narrow band pass filter mounted on an optical axis for substantially transmitting light having a frequency of from $(f_o - \Delta f)$ to $(f_o + \Delta f)$, and a phase modulator juxtaposed with the narrow band pass filter on the optical axis, the phase modulator including an optical crystal having counter faces and counter electrodes formed on the counter faces, and the phase modulator receiving an electrical signal having a frequency of $\Delta f$ or higher and changing the refractive index by the Pockels effect.

The phase modulator changes tile frequency spectrum of incident light and generates side bands having a gap or interval corresponding to the modulating frequency. If the gap of side bands is wider than a half of the pass band of the narrow band pass filter, the side bands are intercepted by the narrow band pass filter.

If the center frequency component is sufficiently reduced by adjusting the phase modulator which generates various frequency spectra, phase-modulated light can be substantially intercepted by the narrow band pass filter.

Namely, light passing first through the narrow band pass filter and then through the phase modulator is modulated and outputted as it is. However, the reflected return light is substantially intercepted by the narrow band pass filter.

The phase modulator modulates light under an electric field, without using a magnetic field and hence, a magnet. An external magnetic field, if present, will not affect the phase modulator.

DETAILED DESCRIPTION OF THE PREFERRED EMBODIMENTS

Figure 1A:
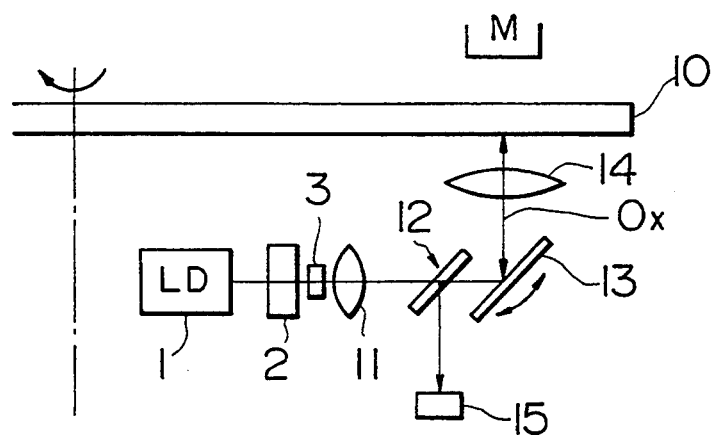
FIG. 1A is a first schematic diagram, partially in section, showing a photomagnetic disk drive and a photo isolator of the disk drive, according to an embodiment of the present invention.
Figure 1B:
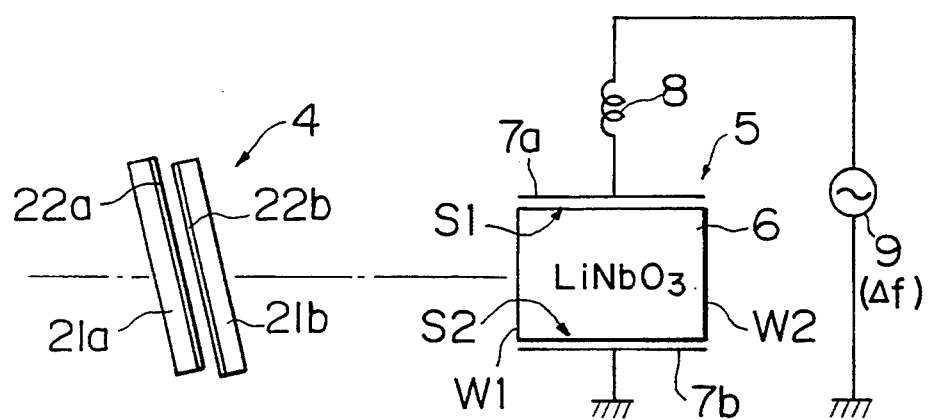
FIG. 1B is a second schematic diagram, partially in section, showing a photomagnetic disk drive and a photo isolator of the disk drive, according to an embodiment of the present invention.

FIGS. 1A and 1B illustrate an embodiment of the invention. FIG. 1A is a schematic diagram showing the optical system of a photomagnetic disk drive. In the photomagnetic disk drive, light radiated from a light source laser diode 1 is applied to a photomagnetic film formed on the bottom surface of a photomagnetic disk 10. Information can be written in the photomagnetic film by the application of light and a magnetic field from a magnet M, and can be read therefrom by the application of light.

Along an optical axis Ox extending from the laser diode 1 to the photomagnetic disk 10, there are disposed a light modulator 2, a photo isolator 3, a lens 11, a beam splitter 12, a reflecting mirror 13, and a lens 14, in the order recited. The laser diode 1 has an active layer of multi quantum wells formed, for example, by super lattices of InGaP and AlInGaP, and the laser diode 1 radiates coherent light of 633 nm.

The light modulator 2 is comprised of a semiconductor which changes the absorption coefficient with the applied electric The light modulator 2 selectively absorbs incident light, during a data write, to control the intensity of output light. The photo isolator 3 transmits incident light from the light modulator 2 and applies it to the lens 11, or intercepts light propagating in the reverse direction.

Light incident to tile lens 11 from the light isolator 3 is focussed on the bottom surface of the photomagnetic disk 10 via the beam splitter 12, reflecting mirror 13, and lens 14. The beam splitter 12 may be formed by a so-called half mirror which reflects part of incident light. The reflecting mirror 13 reflects the whole of incident light.

While light is scanned on the photomagnetic disk 10 the radial direction, the distance between the beam splitter 12 and the reflecting mirror 13 is changed. In this case, if the lens 11 can function as a collimator lens for converting incident light into parallel light, the amount of light incident to the photomagnetic disk 10 can be maintained substantially constant irrespective of the position of the reflecting mirror 13.

In writing data, an external magnetic field is applied from the magnet to the photomagnetic disk 10 at the area where light is applied. When the magnetic field is applied, light of high intensity is radiated from the laser diode 1, modulated by the light modulator 2, and applied to the photomagnetic film on the bottom surface of the photomagnetic disk 10. In this manner, data is written in the photomagnetic film.

In reading data, light of low intensity is radiated from the laser diode 1, and transmitted through the light modulator 2 without being modulated. Incident light to the photomagnetic disk 10 is reflected by the photomagnetic film formed on the bottom surface of the photomagnetic disk 10. The reflection is dependent upon the surface condition of the film. The reflected light is further reflected by the beam splitter 12 and detected by a photodetector 15 made of a semiconductor photodiode or the like.

If light reflected at the bottom surface of the photomagnetic disk 10 is permitted to return to the light modulator 2 and laser diode 1, the operations of these elements are disturbed. Therefore, the photo isolator 3 is used to intercept the returning light.

FIG. 1B illustrates the structure of the photo isolator 3. Referring to FIG. 1B, the photo isolator 3 has a narrow band pass filter 4 and a phase modulator 5. The narrow band pass filter 4 is made of a Fabry-Perot etalon.

The narrow band pass filter 4 has two parallel quartz plates 21a and 21b facing each other and spaced apart by 1 mm. Metal reflecting mirrors 22a and 22b are formed on the inner counter surfaces of the parallel quartz plates 21a and 21b. The metal reflecting mirrors 22a and 22b are not total reflection mirrors, but partial reflection mirrors having a predetermined reflectance R, For example, R=99%.

Figure 2A:
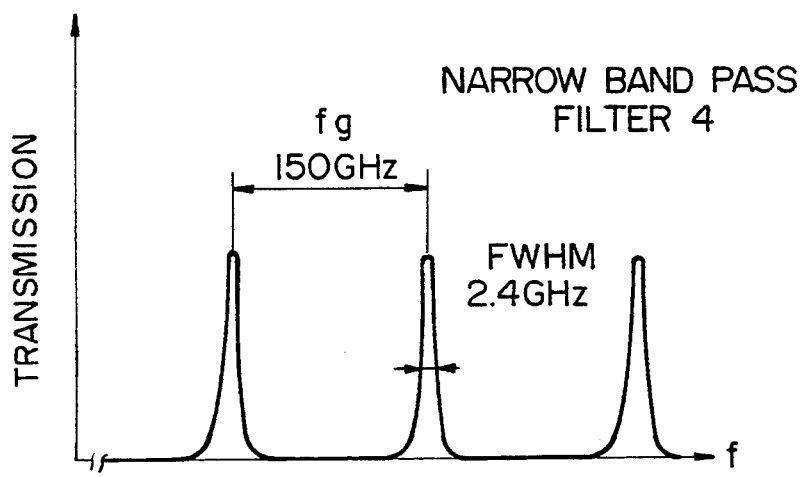
FIG. 2A is a first graph showing the characteristics of the narrow band pass filter and the phase modulator used by the photo isolator shown in FIG. 1B.

FIG. 2A schematically shows the light transmission characteristic of the Fabry-Perot etalon having the structure shown in FIG. 1B. The light transmission spectrum of the Fabry-Perot etalon with the distance of 1 mm between two counter reflecting surfaces and with the reflectance of 99%, has a full width half maximum FWHM of about 2.4 GHz and a frequency gap fg between adjacent pass bands of about 150 GHz.

Either the distance and angle between two counter reflecting surfaces of the Fabry-Perot etalon or the oscillation frequency of the laser diode 1 is controlled so as to make the oscillated laser wavelength of the laser diode coincide with one of the pass bands of the etalon.

Referring back to FIG. 1B, the phase modulator 5 is made of LiNbO$_3$ crystal 6 of a rectangular solid shape. The LiNbO$_3$ crystal changes its refractive index by the Pockels effect when an electric field is applied.

The LiNbO$_3$ crystal 6 has a pair of light incident faces w1 and w2 and a pair of counter faces S1 and S2. On the counter faces S1 and S2, a pair of counter electrodes 7a and 7b is formed for the application of an electrical field to the crystal 6.

One counter electrode 7b is grounded and the other counter electrode 7a is connected to a modulator power source 9 via an inductor 8. The modulator power source 9 generates a modulating voltage having a modulating frequency of, for example, $\Delta f = 2$ GHz.

Figure 2B:
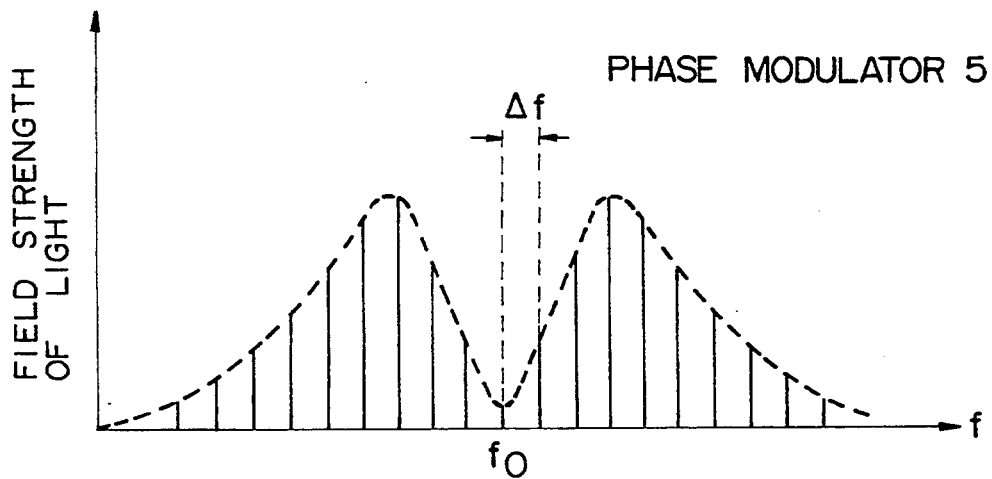
FIG. 2B is a second a second graph showing the characteristics of the narrow band pass filter and the phase modulator used by the photo isolator shown in FIG. 1B FIGS. 3A, 3B and 3C are graphs explaining the operation of the photo isolator shown in FIG. 1B.

FIG. 2B illustrates the function of the phase modulator 5. When a modulating voltage having the modulating frequency $\Delta f$ is applied, the phase modulator 5 generates side bands at the gap $\Delta f$ relative to the incident light having the frequency fo.

Representing the amplitude E of the electric field amplitude of an incident laser beam by:

$$E(t) = E \cos(\omega t) \tag{1}$$

the amplitude of the electric field of light outputted from the phase modulator 5 is given by:

$$E(t) = E \cos\{\omega t + (Wd/Wo) \cos(Wo\, t)\} \tag{2}$$

where $\omega$ is an angular velocity of the incident light, Wd is an angular velocity deviation at the phase modulator, and Wo is the modulating angular velocity.

The equation (2) can be developed to the following equation (3) by using the first kind Bessel function:

$$\begin{aligned} E(t) = &\ E\, [J0\,(m) \cos(\omega t) \\ &+ J1\,(m) \{\cos(\omega + Wo)t - \cos(\omega - Wo)t\} \\ &+ J2\,(m) \{\cos(\omega + 2Wo)t - \cos(\omega - 2Wo)t\} \\ &+ J3\,(m) \{\cos(\omega + 3Wo)t - \cos(\omega - 3Wo)t\} + \ldots \end{aligned} \tag{3}$$

where m = Wd/Wo. A frequency fo corresponds to the angular velocity $\omega$, and the frequency $\Delta f$ corresponds to the angular velocity Wo.

Incident light to the photomagnetic disk is modulated as shown in FIG. 2B. If one of the pass bands of the narrow pass band filter is made smaller than 2Δf, the side band components of the reflected light can be removed.

Figure 3A:
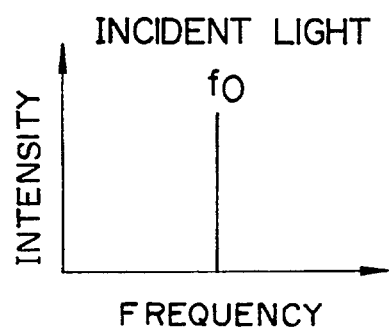
Figure 3B:
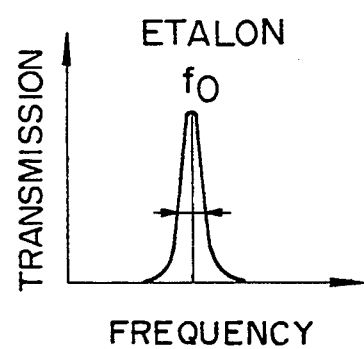
Figure 3C:
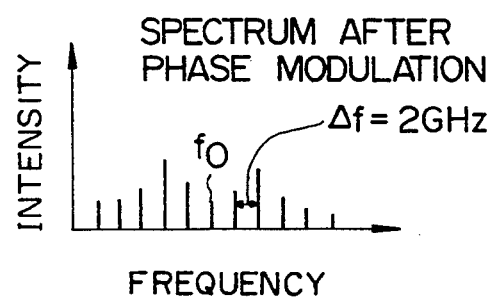

This operation is briefly illustrated in FIGS. 3A to 3C. FIG. 3A explains a single mode light beam generated by the laser diode, the single mode light beam containing only the frequency component of fo.

FIG. 3B shows the transmission characteristic of the narrow pass band filter made of the etalon. The pass band has a center frequency of f0 and the pass band width at the half of the peak transmittance, i.e., FWHM, of about 2.4 GHz.

FIG. 3C shows the frequency spectra of the phase modulator. When light of the frequency fo becomes incident to the phase modulator, light beams having the spectra shown in FIG. 3C are outputted.

More specifically, the spectra of the outputted light beams contain spectra of side bands of Δf=2 GHz relative to the center frequency fo. The spectra distribution of side bands follows the Bessel function Ji (m).

If the component of the center frequency fo is sufficiently suppressed, the light of the frequency fo returned from the narrow band pass filter 4 to the light modulator 2 and laser diode 1 can be neglected because of its small intensity. The other side band components can be removed by the filter 4.

One half of the full width half maximum FWHM of 2.4 GHz is 1.2 GHz. For this band width, the frequency difference between side bands has been set to Δf=2 GHz. However, if side bands can be suppressed sufficiently, the modulating frequency may be set lower. If on the other hand the modulating frequency is set higher, the side band removing factor can be improved further.

The characteristic of the narrow band pass filter using a Fabry-Perot etalon and that of the phase modulator will be described more in detail. The resonance peak frequency gap fg of a Fabry-Perot etalon and the pass band FWHM are given by:

$$fg = c/2nd \text{ and } FWHM = (c/2\pi nd)\{(1-R)/(R)^{\frac{1}{2}}\}$$

where c is a light velocity, n is a reflectance of the etalon, d is the distance between the mirrors, and R is the reflectance of the mirrors.

For the etalon with the mirror distance d=1 mm and the reflectance R=99%, the values of fg and FWHM are:

$$fg = 150 \text{ GHz and } FWHM = 2.4 \text{ GHz}.$$

Phase modulation by $LiBnO_3$ crystal is possible up to ten and several GHz according to the current state of the art. The half wavelength voltage giving an applied voltage a phase deviation of λ is expressed by:

$$V(\lambda/2) = \lambda_0 d_c / n_e^3 r_c l$$

where λ is the wavelength of light, $d_c$ is the thickness of crystal, and l is the length of crystal. The half wavelength voltage V (λ/2) is therefore proportional to $d_c/l$.

Accordingly, the half wave voltage can be controlled by the size of crystal. It is preferable not to make the crystal length too long in order to prevent an increase of the stray capacitance at a high frequency. As an example, $LiNbO_3$ crystal with $d_c=0.3$ mm, $l=10$ mm, and $\lambda_o=633$ nm gives the half wave voltage V (λ/2) of approximately 60 V.

In the above description, the oscillation wavelength of the laser diode has been set to 633 nm. It is apparent that other laser beams of different wavelengths may also be used. It is however preferable that the line width of the laser beam is narrower than the band width of the etalon and that the laser beam is oscillated in a single mode.

An etalon is sensitive to a change in the environmental temperature. If it is used under the environment of large temperature change, the wavelength of the etalon transmittance peak is influenced by the temperature change. In such a case, it is desired to control the angle between mirrors of the etalon or provide a feedback system for controlling the distance between mirrors of the etalon.

Figure 4:
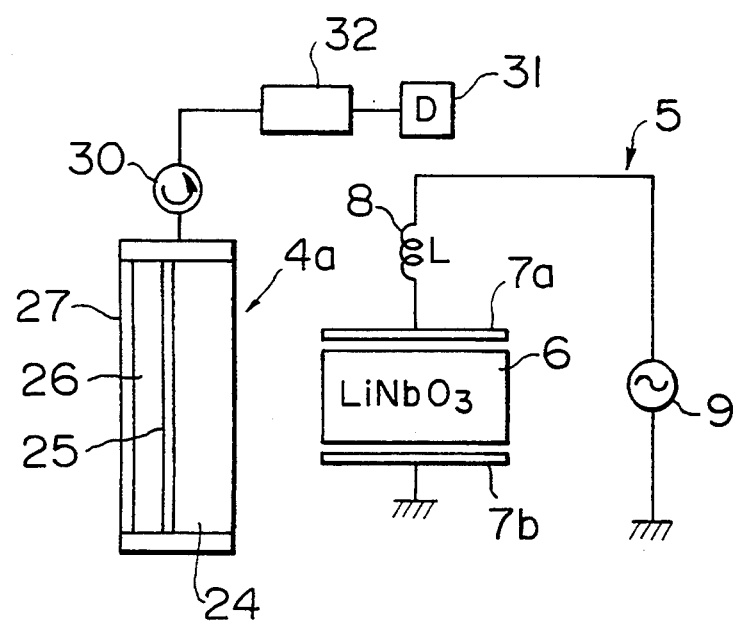
FIG. 4 is a schematic cross section showing a photo isolator according to another embodiment of the present invention.

FIG. 4 shows a photo isolator according to another embodiment of the invention. The phase modulator 5 is similar to the phase modulator shown in FIG. 1B.

A narrow band pass filter 4a is constructed of a multi-layer filter formed on a transparent substrate 24 made of quartz. The multi-layer filter includes a reflecting surface 25, a transparent film 27, and another reflecting surface 27. The reflecting surfaces 25 and 27 may be formed of metal films whose thickness are controlled to have a predetermined reflectance. A dielectric multi-layer filter may also be used.

The transparent film 26 is formed to uniquely determine the transmission wavelength of the Fabry-Perot etalon 4a made of the multi-layer filter.

A rotary mechanism 30 is coupled to the Fabry-Perot etalon 4a so that the angle of the etalon 4a relative to the optical axis can be regulated. The angle of the rotary mechanism 30 is controlled by a controller 32.

A temperature detector 31 detects an environmental temperature and supplies the measured temperature to the controller 32. In accordance with the detected temperature signal, the controller 32 controls the rotary mechanism 30 to regulate the ankle of the Fabry-Perot etalon 4a relative to the optical axis.

As the environmental temperature changes, the angle of the Fabry-Perot etalon 4a is controlled to maintain the transmission wavelength constant. These rotary mechanism and control mechanism may be used for the photo isolator shown in FIG. 1B.

Figure 5:
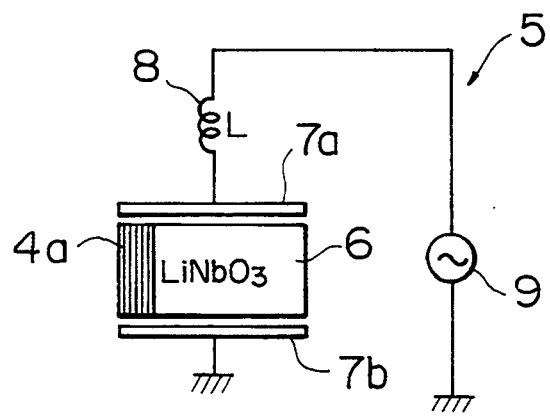
FIG. 5 is a schematic cross section showing a photo isolator according to another embodiment of the present invention.
Figure 6:
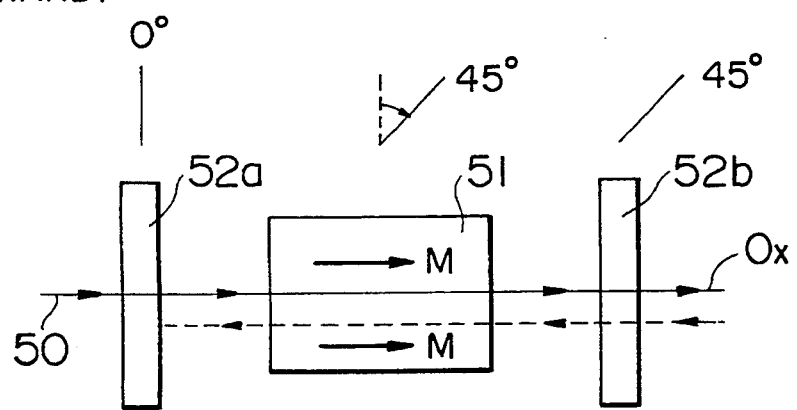
FIG. 6 is a schematic cross section showing the structure of a conventional photo isolator.
Figure 6:
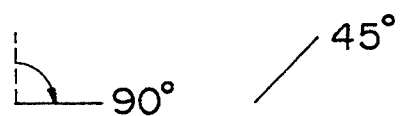

FIG. 5 shows the structure of a photo isolator according to another embodiment of the invention. In this embodiment, a multi-layer filter 4a is formed on the light incident surface of optical crystal $LiNbO_3$ 6 of a phase modulator 5.

The multi-layer filter 4a has the same structure as that shown in FIG. 4 except that the substrate 24 is not used, The other structures are the same as those shown in FIG. 1B and FIG. 4.

In this embodiment, the narrow band pass filter is formed integrally with the phase modulator, making the whole structure compact.

The invention has been described with a limited number of embodiments. The invention is not intended to be limited by these embodiments. For example, the structures of the narrow band pass filter and phase modulator may be changed so long as they provide the functions equivalent to the embodiments.

It is apparent for those skilled in the art that various modifications, improvements, combinations and the like may be made without departing from the spirit and scope of the present invention.

I claim:

1. A photo isolator for transmitting light of a frequency fo in a first direction and substantially intercepting the light when transmitted in a second, reverse direction, comprising:

a phase modulator comprising an optical crystal, with a refractive index, having counter faces and counter electrodes formed on said counter faces;

means for applying a modulating voltage having a modulating frequency of $\Delta f$ or a higher frequency than $\Delta f$ to said counter electrodes;

a narrow band pass filter having a half band width of $\Delta f$ and mounted on an optical axis for substantially transmitting light having a frequency of from $(fo-\Delta f)$ to $(fo+\Delta f)$; and said phase modulator being juxtaposed with said narrow band pass filter on said optical axis and said phase modulator changing the refractive index of the optical crystal by Pockels effect.

2. A photo isolator according to claim 1, wherein said narrow band pass filter is a Fabry-Perot etalon having reflecting surfaces mutually disposed in parallel and spaced apart by a preselected distance.

3. A photo isolator according to claim 2, wherein said Fabry-Perot etalon includes a multi-layer filter.

4. A photo isolator according to claim 3, wherein said multi-layer filter is formed on said optical crystal.

5. A photo isolator according to claim 1, further comprising an angle adjusting mechanism for adjusting the angle of said narrow band pass filter relative to said optical axis.

6. A photo isolator according to claim 5, further comprising temperature compensating means for detecting an environmental temperature and controlling said angle adjusting mechanism in accordance with said detected environmental temperature.

* * * * *

UNITED STATES PATENT AND TRADEMARK OFFICE
CERTIFICATE OF CORRECTION

PATENT NO. : 5,448,396
DATED : Sep. 5, 1995
INVENTOR(S) : FUKUSHIMA

It is certified that error appears in the above-indentified patent and that said Letters Patent is hereby corrected as shown below:

Col. 2, line 20, change "tile" to --the--.

Col. 3, line 24, after "electric" insert --field.--;
line 25, delete the paragraph indention.

Col. 4, line 13, change "For" to --for--;
line 56, change "where m" to --where $\omega$--;
lines 63-65 (equation (3), lines 2-4), add -- + -- at the beginning of each line and delete " + " at the end of each line.

Signed and Sealed this

Fifth Day of December, 1995

Attest:

BRUCE LEHMAN

*Attesting Officer*     *Commissioner of Patents and Trademarks*